United States Patent [19]

Osborne et al.

[11] 4,402,054

[45] Aug. 30, 1983

[54] METHOD AND APPARATUS FOR THE AUTOMATIC DIAGNOSIS OF SYSTEM MALFUNCTIONS

[75] Inventors: Robert L. Osborne, Nether Providence Township, Delaware County; Paul H. Haley, Monroeville; Stephen J. Jennings, Radnor Township, Delaware County, all of Pa.

[73] Assignee: Westinghouse Electric Corp., Pittsburgh, Pa.

[21] Appl. No.: 197,319

[22] Filed: Oct. 15, 1980

[51] Int. Cl.[3] .............................................. G06F 15/36

[52] U.S. Cl. .................................... 364/554; 364/551

[58] Field of Search ........................ 364/551, 552, 554

[56] References Cited

U.S. PATENT DOCUMENTS

| | | | |
|---|---|---|---|
| 3,526,836 | 9/1970 | Deger et al. | 364/554 X |
| 4,115,867 | 9/1978 | Vladimirov et al. | 364/554 X |
| 4,133,039 | 1/1979 | Eichenlaub | 364/554 |
| 4,139,895 | 2/1979 | Kurkjian et al. | 364/554 X |
| 4,205,383 | 5/1980 | Bakanovich et al. | 364/554 |
| 4,219,877 | 8/1980 | Vladimirov et al. | 364/554 |
| 4,241,889 | 12/1980 | Schwellinger | 364/554 X |

*Primary Examiner*—Edward J. Wise
*Attorney, Agent, or Firm*—D. Schron

[57] ABSTRACT

Diagnostic apparatus for monitoring a system subject to malfunctions. Estimates are obtained relating normal system operation to operating variables. Estimates are additionally obtained relating specific malfunctions to specific variables. The variables are combined in accordance with predetermined functions to get an indication of a particular malfunction. This indication is modified by a factor related to the normal operation of the system to yield a probability of the occurrence of the malfunction, and which probability is limited to a value less than 100%.

8 Claims, 25 Drawing Figures

| | $M_1$ | $M_2$ | $M_3$ | $M_4$ | $M_5$ | $M_6$ |
|---|---|---|---|---|---|---|
| $y_1$ | X | X | X | X | | |
| $y_2$ | X | X | | | X | |
| $y_3$ | X | | X | | | X |

METHOD AND APPARATUS FOR THE AUTOMATIC DIAGNOSIS OF SYSTEM MALFUNCTIONS

BACKGROUND OF THE INVENTION

1. Field of the Invention

The invention in general relates to monitoring apparatus, and particularly to apparatus which will automatically diagnose a system malfunction, with a certain degree of probability.

2. Description of the Prior Art

The operating condition of various systems must be continuously monitored both from a safety and economic standpoint so as to obtain an early indication of a possible malfunction so that corrective measures may be taken.

Many diagnostic systems exist which obtain base line standards for comparison while the system to be monitored is running under normal conditions. The monitored system will include a plurality of sensors for obtaining signals indicative of certain predetermined operating parameters and if the monitored system includes rotating machinery, the sensors generally include circuits for performing real time spectrum analysis of vibration signals.

The totality of sensor signals are continuously examined and if any of the signals should deviate from the base line standard by a predetermined amount, an indication thereof will be automatically presented to an operator. Very often, however, the signal threshold levels are chosen at a value such that it is too late to take adequate protective measures once an alarm has been given. If, however, the threshold levels are set lower, they may be at a value such that an alarm is given prematurely and even unnecessarily. A shutdown of an entire system based upon this premature malfunction diagnosis can represent a significant economic loss to the system operator.

One type of diagnostic apparatus proposed, presented an operator with the probability of a malfunction based upon certain measured parameters. The malfunction probabilities presented to the operator, however, were still based upon certain signals exceeding or not exceeding a preset threshold level.

Another proposed diagnostic arrangement had for an object the display of a continuous indication of the probability as a malfunction. This proposed arrangement was predicated upon estimated failure rates and certain multivariate probability density functions describing specific malfunctions related to the totality of measurements. Such rates and functions, however, are extremely difficult, if not impossible, to obtain.

The diagnostic apparatus of the present invention will present to an operator a continuous indication of the probability of a malfunction based on two or more sensor readings, and not dependent upon simply exceeding selected threshold levels, so that the operator may be given an early indication and may be continuously advised of an increasing probability of one or more malfunctions occurring.

SUMMARY OF THE INVENTION

In accordance with the present invention an operating system to be diagnosed for the existence of malfunctions has certain operating parameters measured. These parameters constitute variables, some of which are relevant to a particular malfunction and others of which are non-relevant.

The normal operation of the system is characterized as a function of each variable. In addition, the probability of the existence of each malfunction is characterized as a function of each relevant variable. These characterizations may be provided as estimates by persons knowledgeable in the field to which the system pertains.

Certain functional forms are chosen to modify and combine the variables, including modification by a factor related to the probability of normal (or non-normal) operating condition of the system, to obtain, for each possible malfunction, the probability of the existence of that malfunction. These probabilities may then be displayed to an operator.

Additionally, the probability of the existence of an undefined malfunction may be derived and displayed. For a more conservative indication each probability may be limited to a value of less than 100%.

DESCRIPTION OF THE PREFERRED EMBODIMENT

Figure 1:
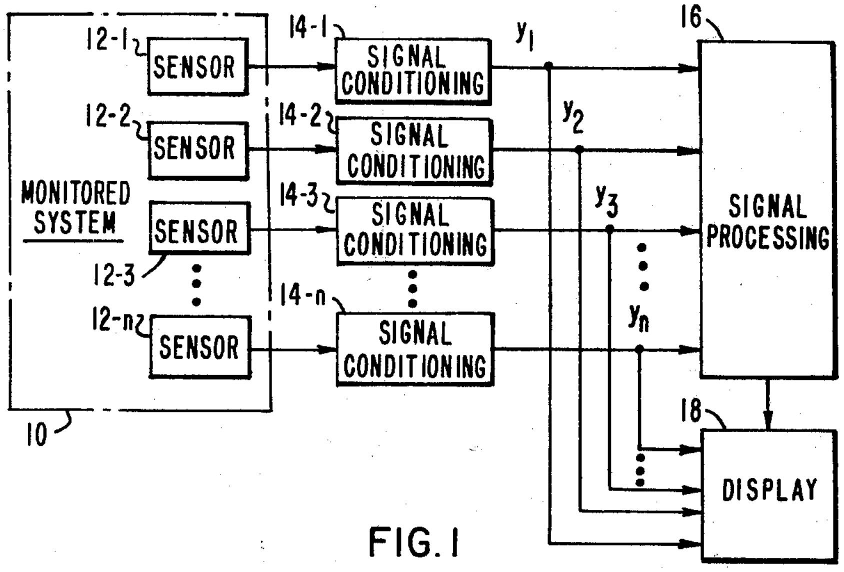
FIG. 1 is a block diagram illustrating a diagnostic system.

In FIG. 1 a system 10 to be monitored is provided with a plurality of sensors 12-1 to 12-n each for detecting a certain operating condition such as, for example, temperature, pressure, vibration, etc. with each being operable to provide an output signal indicative of the condition. The sensor output signals are provided to respective signal conditioning circuits 14-1 to 14-n, such conditioning circuits being dependent upon the nature of the sensor and signal provided by it and containing, by way of example, amplifiers, filters, spectral analyzers, fast Fourier transform circuits to get frequency components, to name a few.

Each signal conditioning circuit provides a respective output signal $y_1$ to $y_n$, each signal $y_i$ being indicative of a measured parameter and each constituting a variable which is provided to a signal processing circuit 16. The signal processing circuit is operable to combine the signals in a manner to be described so as to provide a display 18, and/or other types of recording instrumentation, with an indication of the probability of the occurrence of one or more malfunctions within the monitored system 10. If desired, the magnitude of the variables themselves may be also displayed by providing signals $y_1$ through $y_n$ to display 18. As will be described, the display may include a cathode ray tube for presentation of the processed signals.

Although FIG. 1 illustrates the simple arrangement of one variable resulting from one measurement, it is to be understood that a signal conditioning circuit may provide more than one output in response to a single measurement. For example, in the malfunction diagnosis of rotating machinery, a shaft vibration sensor may provide an output signal which is analyzed and conditioned to give signals representative of running speed, amplitude and phase, rate of change of phase, second harmonic of running speed and one half running speed harmonic, to name a few. Conversely, two or more sensor signals may be combined and conditioned to result in a single output variable.

The operation of the signal processing circuit 16 is based upon certain inputs relative to the probability that each variable $y_i$ is in its normal range of operation when the monitored system is operating correctly, and is further based upon the relationship between the probability that a certain malfunction has occurred as a function of the magnitude of a variable. The various probabilities of a particular malfunction based upon the variables are then combined and modified by a factor relating to the normal operating condition of the system to yield, for each possible malfunction, an output signal indicative of the probability that that particular malfunction is occurring. By way of example the information may be combined in accordance with the following equation:

$$P(M_j|y) = [1 - F_0(y)]\frac{F_j(y)}{PT + \sum_{j=1}^{m} F_j(y)} \quad (1)$$

In equation (1), M connotates a malfunction and j relates to a particular malfunction. y represents an array of variables, a vector, made up of input signals $y_1$ to $y_n$. The function $F_0(y)$ is the probability that the monitored system, including the sensor devices, is in a normal operating condition. Thus the bracketed term $1-F_0(y)$ is the probability that the system is not in a normal operating condition. Each function $F_j(y)$ is the unnormalized conditional probability of occurrence of a malfunction j given the set of measurements y. If there is a possibility of m malfunctions, then the expression $$\sum_{j=1}^{m} F_j(y)$$

in the denominator of equation (1) represents the summation of all of the computed $F_j(y)$ values for each particular malfunction, that is, $F_1(y)+F_2(y)+F_3(y)-+-+F_m(y)$ and $$\frac{F_j(y)}{\sum_{j=1}^{m} F_j(y)}$$

is the normalized malfunction indication.

The term PT in the denominator of equation 1 is inserted to limit the threshold probability. For example, suppose it is decided that no diagnosis probability will be greater than 95%. Then PT is chosen as $1-0.95$, that is, PT would be equal to 0.05. The expression on the right-hand side of equation 1 therefore, is the probability that a malfunction $M_j$ exists given that $1-F_0(y)$ is the degree of certainty that the system is not in the normal operating condition. That is, it is the probability that $M_j$ exists given measurement vector y, the statement of the left-hand side of equation 1. The probability that no malfunction exists ($M_0$) given the measurement vector y is given by:

$$P(M_0|y)=F_0(y) \quad (2)$$

In many systems the measured parameters may point to an unknown or undefined malfunction $M_u$ for which case $$P(M_u|y) = [1 - F_0(y)]\frac{PT}{PT + \sum_{j=1}^{m} F_j(y)} \quad (3)$$

The probabilities of all possible states, equations (1), (2) and (3), must sum to 1.

Figure 2:
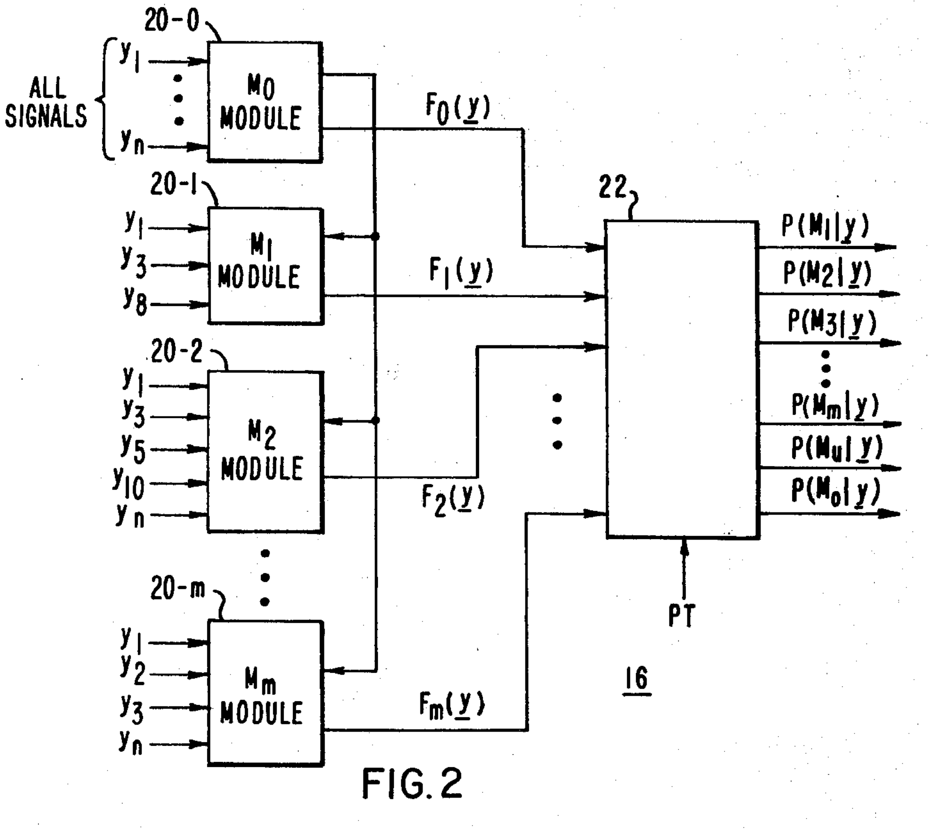
FIG. 2 is a block diagram illustrating the signal processing circuitry of FIG. 1 in more detail.

In order to implement the probability computations therefore, and as illustrated in FIG. 2, the signal processing circuitry 16 may include a plurality of modules 20-0 to 20-m, each responsive to input variable signals to compute a conditional probability. Thus module 20-0 is responsive to all of the measured variables $y_1$ to $y_n$ to derive the function $F_0(y)$ indicative of the healthy or normal state of the monitored system. Each of the remaining modules 20-1 to 20-m, one for each specified malfunction, is responsive to only those particular variables associated with a particular malfunction. By way of example if there are n variables ($Y_n$ signals) malfunction $M_1$ may be correlated with three of the n variables, $y_1$, $y_3$ and $y_8$. Further by way of example, malfunction $M_2$ may be correlated with variables $y_1$, $y_3$, $y_5$, $y_{10}$ and $y_n$ while malfunction $M_m$ may be correlated with variables $y_1$, $y_2$, $y_3$, and $y_n$. The number of variables directly correlated with a particular malfunction of course would depend upon the particular system that is being monitored.

The computed values $F_0(y)$ and $F_j(y)$ (j=1,m) are combined in circuit 22 which also receives an input signal PT to generate all the probability output signals illustrated. The signals may be recorded and/or presented to a display so as to enable an operator to use his judgement in taking any appropriate necessary action.

The probability that the system is in the healthy state is the product of the probabilities that the system is in the healthy state based on each measurement $y_i$. That is:

$$F_0(y)=f_1(y_1)\cdot f_2(y_2)—f_n(y_n) \quad (4)$$

Each term $f_i(y_i)$ of equation (4) may be represented by a certain function. By way of example an exponential may be chosen to represent each term such that:

$$F_0(y) = f(y) = e^{-\frac{1}{2}|x_1|^{k_1}} \cdot e^{-\frac{1}{2}|x_2|^{k_2}} \cdots e^{-\frac{1}{2}|x_3|^{k_n}} \quad (5)$$

The multiplication of exponentials is the same as adding their exponents to that equation (5) may be defined by equation (6).

$$F_0(y) = f(y) = e^{(-\frac{1}{2}\sum_{i=1}^{n}|x_i|^{k_i})} \quad (6)$$

Probability curves may be generated relating to the probability of normal operation of the monitored system with respect to the magnitude of a particular signal $y_i$. If there are n signals therefor, n probability curves must be generated. The values of $x_i$ and $k_i$ in equation 6 relate to the scaling, shifting, and shape of the particular curves, as will be explained.

Figure 3:
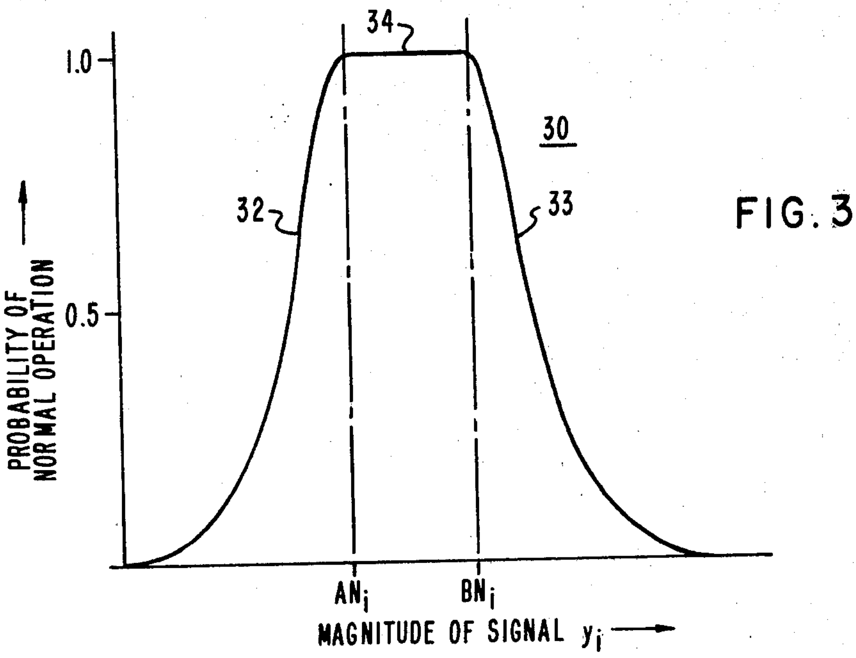
FIG. 3 is a curve illustrating the probability of normal operation of a monitored system as a function of a measured variable.

The horizontal axis of FIG. 3 represents the magnitude of any signal $y_i$ while the vertical axis represents the probability of normal operation of the monitored system as a function of the magnitude of signal $y_i$. The relationship is given by curve 30 and it is seen that the curve has a particular shape defined by sloping sides 32 and 33 with a flattened top portion 34. That is, there is a high probability that the monitored system is operating normally, insofar as variable $y_i$ is concerned, when the magnitude of $y_i$ is between $AN_i$ and $BN_i$. A signal of magnitude below $AN_i$ or above $BN_i$ means that the probability falls off at a rate determined by the slopes of portions 32 and 33. Curve 30 may be based upon actual data that might be available from an operating system or alternatively may be based upon the valued judgement of personnel having expertise in the field to which the monitored system pertains.

The terms $x_i$ and $k_i$ of equation (6) are utilized to approximate each curve such as in FIG. 3 by the chosen function $f_i(y_i)$.

Figure 4:
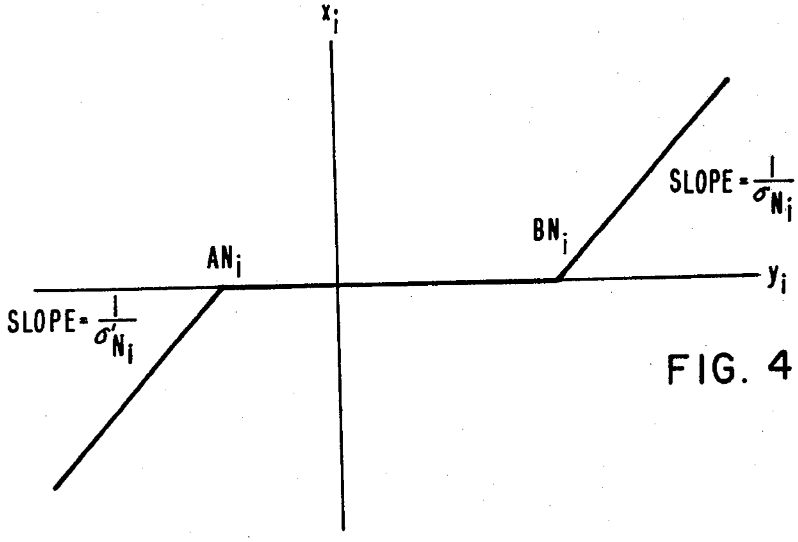
FIG. 4 is a curve to explain a certain transform utilized herein.

In implementing the determination of $F_0(y)$ an initial shifting and scaling is accomplished by the use of the curve illustrated in FIG. 4 whereby the magnitude of a variable $y_i$ may be transformed to a different value $x_i$. In FIG. 4 it is seen that the curve has a flat segment where $x_i$ is 0 between break points $AN_i$ and $BN_i$, corresponding to the range $AN_i$ to $BN_i$ of FIG. 3.

Figure 5:
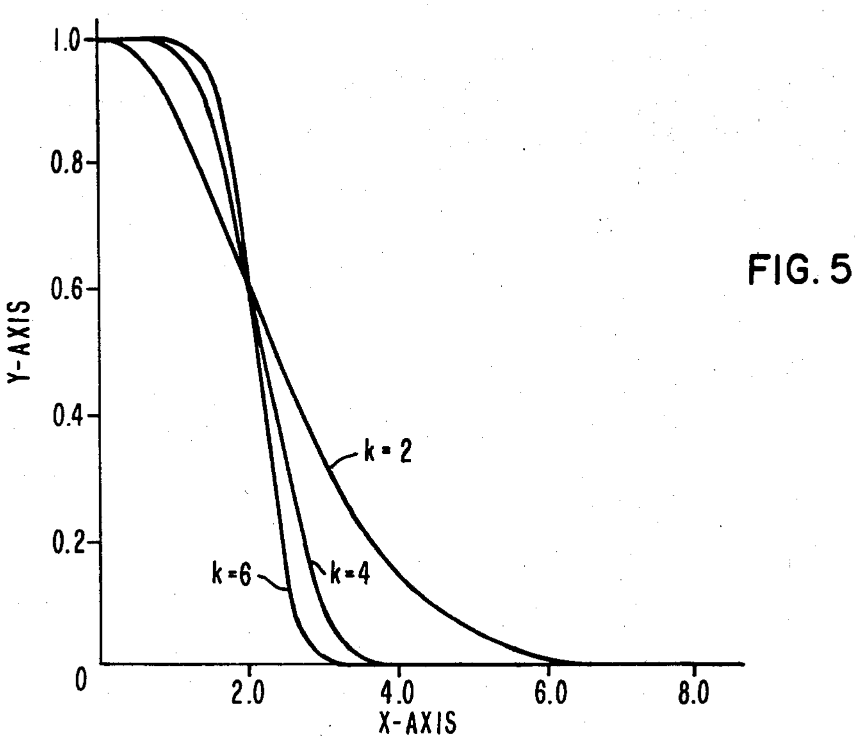
FIGS. 5 and 6 are exponential plots to aid in an explanation of certain terms utilized herein.

In the curve fitting process, a family of curves such as illustrated in FIG. 5 may be generated based upon the exponential function $$f_1(x, k) = e^{-\frac{1}{2}|x|^k}$$

FIG. 5 shows three curves plotted for k=2, 4 and 6. It is seen that all three curves peak and flatten out at a value of 1 on the y axis. Taking into account that in most circumstances a probability of malfunction prediction of less than 100% will be given, the value of PT (equation (1)) may be taken into account as illustrated by the family of curves of FIG. 6, these curves being the plot of the exponential relationship $$f_2(x,k) = \frac{f_1(x,k)}{PT + f_1(x,k)},$$

where PT equals 0.05.

Figure 6:
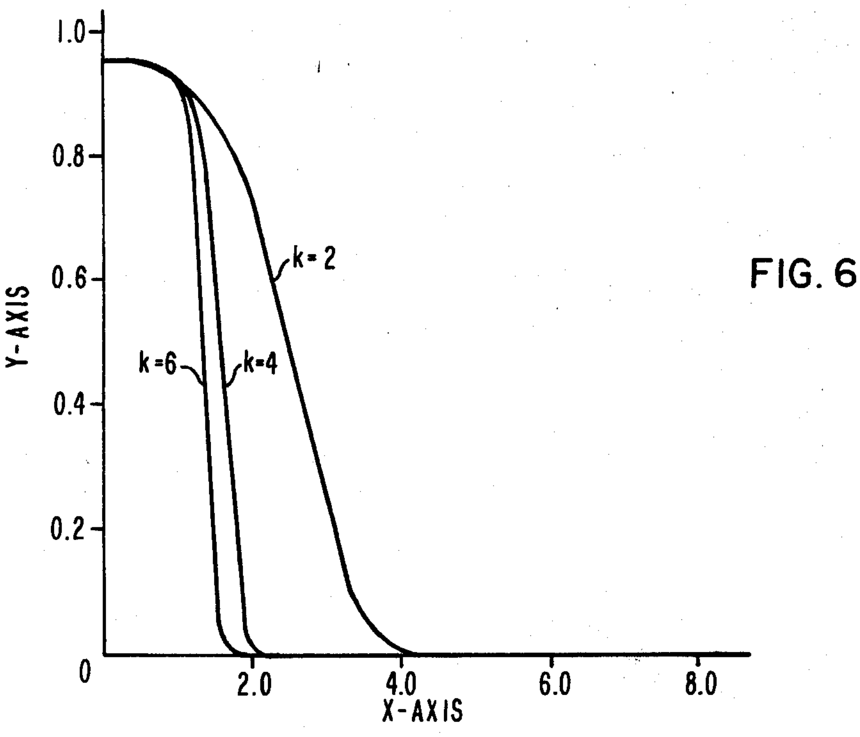

Returning once again to FIG. 4, the slopes $$1/\sigma_{Ni}$$

and $$1/\sigma'_{Ni}$$

are obtained by initially selecting the appropriate curves of the family of curves illustrated in FIG. 6 with the respective sloping slides 32 and 33 of curve 30 in FIG. 3 and thereafter scaling the two to size. The $k_i$ of equation (6) is chosen in accordance with the k of the particular curve of FIG. 6 which best approximates curve 30 of FIG. 3. A wide variety of shapes may be generated with different values of k.

The foregoing explanation with respect to the transformation and the use of the curves of FIGS. 4, 5 and 6 was but one example of many for curve fitting procedures wich may be utilized to obtain various values for use in equation (6).

Figure 7:
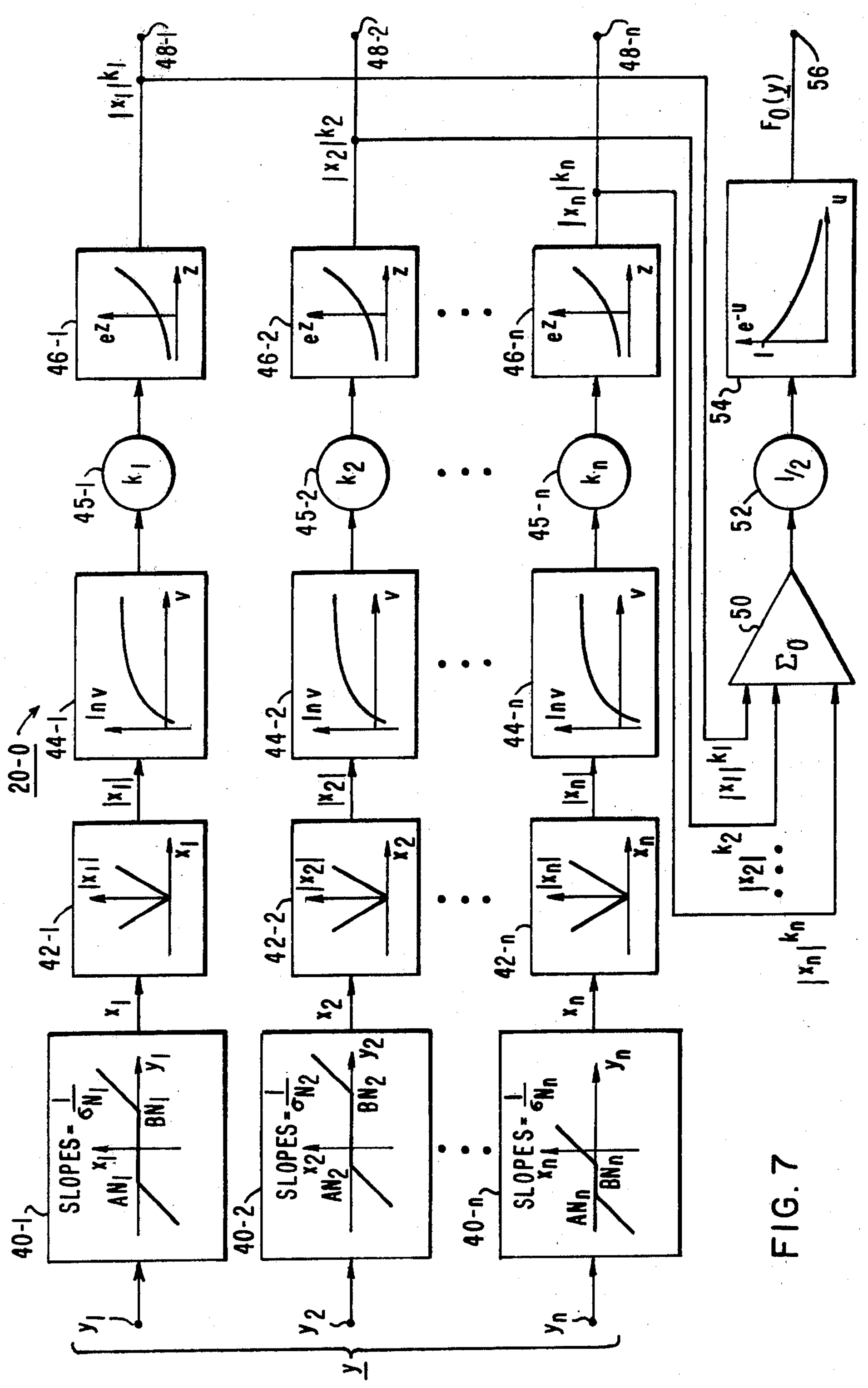
FIG. 7 is a block diagram further illustrating one of the modules of FIG. 2.

The implementation of equation (6) is performed by module 20-0 and one such implementation is illustrated by way of example in FIG. 7.

Each circuit 40-1 to 40-n receives a respective input variable signal $y_1$ to $y_n$ and provides a corresponding transformed signal $x_1$ to $x_n$ in accordance with a curve such as illustrated in FIG. 4 generated for each variable. For simplicity the waveform characterizing normal operation as in FIG. 3 will be assumed to have symmetrical sloping sides so that the slopes $1/\sigma_i$ and $1/\sigma_i'$ shown in circuits 40-1 to 40-n are equal.

Since the exponent of equation (6) includes the absolute value of $x_i$, circuits 42-1 through 42-n are provided for deriving the absolute value of the respective signals $x_1$ to $x_n$. The next step in the computation involves the raising of the absolute value of x to the respective k power. One way of accomplishing this is to first take the log of x, multiply it by the factor k and then take the antilog of the resultant multiplication. Accordingly, to accomplish this, there is provided log circuits 44-1 to 44-n providing respective outputs to potentiometer circuits 45-1 to 45-n each for scaling or multiplying by a particular value of k. Each scaled value is then provided to the respective antilog circuit 46-1 to 46-n, the output signals of which on lines 48-1 to 48-n will be used for deriving the exponential portion in parentheses in equation (6).

According to equation 6, the values $|x_i|^{k_i}$ are all summed together for i=1 to n and then multiplied by $-\frac{1}{2}$. This is accomplished in FIG. 7 with the provision of a summing circuit 50 which receives the output signals on lines 48-1 to 48-n to provide a summed signal to potentiometer 52 which performs the necessary scaling, or multiplying operation by one-half. The resultant signal is then provided to the exponential circuit 54, the output signal of which on output line 56 is the function $F_0(y)$ in accordance with equation (6).

Figure 8:
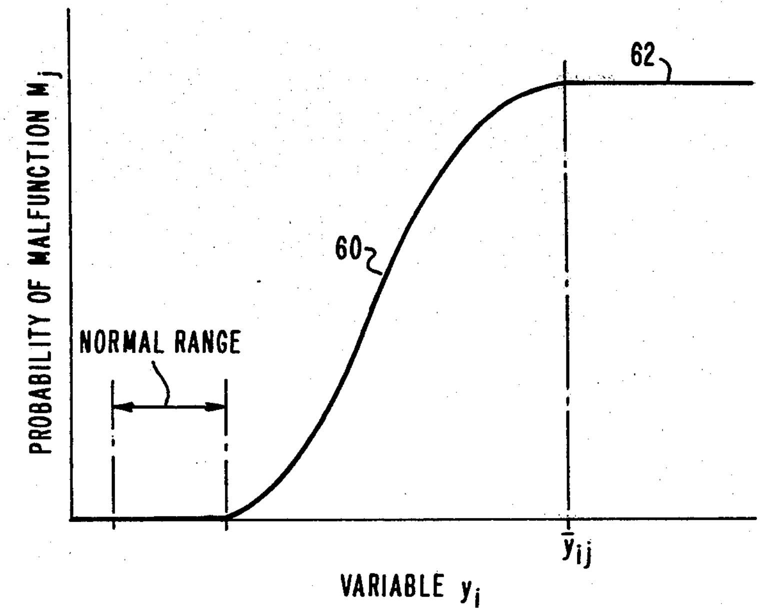
FIG. 8 is a curve illustrating the probability of a particular malfunction with respect to a measured variable.

The remaining modules 20-1 to 20-m of FIG. 2 are each operable to compute a respective unnormalized conditional probability of occurrence of a particular malfunction given a set of relevant variables. To accomplish this, a set of curves is initially generated, as was the case with respect to the derivation of $F_0(y)$ showing the relationship of the probability of a particular malfunction with respect to each relevant variable, as illustrated in FIG. 8.

Curve 60 illustrating one relationship may be generated on the basis of accumulated historical data on the monitored system, or in the absence of such data may be estimated by knowledgeable personnel, as was the case with respect to curve 30 of FIG. 3. It is seen that curve 60 starts off at a very low proability and once the value of variable $y_i$ passes a normal range, curve 60 increases to a leveling off portion 62 which commences at a point where $y_i$ equals $\bar{y}_i$. A functional form is then chosen that conveniently combines all of the information gathered from the relevant variables. This function is defined as $$\tilde{F}_j(y_{rj})$$

where the subcript j connotates a certain malfunction and the subscript r connotates a subset of relevant variables. This function may be a product form, an exponential form or some combination of both. The function is chosen from the general class of functions which are bounded between zero and one, rise in smooth fashion giving "s" shapes and can be shifted and scaled. By way of example, it is defined in exponential form in equation (7).

$$\tilde{F}_j(y_{rj}) = e^{-\frac{1}{2}\left[\left(\frac{(Z'_j)^2}{1+(n_j-1)\rho_j}\right) + \frac{\sum_{i\epsilon r_j}(y'_{ij})^2 - Z_j^2}{1-\rho_j}\right]} \quad (7)$$

wherein again j is a certain malfunction and i is the index set $r_j$. To implement the equation a first transformation is performed on each variable $y_i$ to derive a new variable $y'_{ij}$ in accordance with equation (8).

$$y'_{ij} = \frac{(y_i - \bar{y}_{ij})}{\sigma_{ij}} \quad (8)$$

where $\bar{y}_{ij}$ is the point illustrated in FIG. 8 as $\bar{y}_{ij}$ and $\sigma_{ij}$ is a scaling factor chosen so that the particular curve closely matches a desired profile such as was explained with respect to FIG. 6.

A basic assumption is made that malfunction $M_j$ manifests itself by variables $y_{rj}$ in which a fairly straight line (a vector) in a specific direction is traced by the variables as the malfunction becomes more pronounced. This straight line direction is known as the principal axis and a second transformation is performed in accordance with equation (9) wherein the principal axis coordinate $Z_j$ (i.e. how far along the principal axis the vector has proceeded) is defined as the sum of the $y'_{ij}$ divided by $n_j^{\frac{1}{2}}$:

$$Z_j = \frac{1}{\sqrt{n_j}} \sum_{i\epsilon r_j} y'_{ij} \quad (9)$$

wherein $$\sum_{i\epsilon r_j} y'_{ij}$$

is the sum of all $Y'_{ij}$ whose index i is a member of the index set $r_j$.

Figure 9:
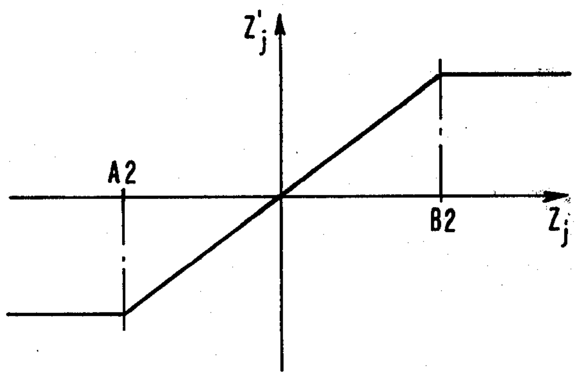
FIG. 9 is a curve utilized to explain certain mathematical operations herein.

A third transformation is used to impose minimum and maximum limits on $Z_j$ by creating the variable $Z_j'$ as illustrated in the curve of FIG. 9. Basically, as the malfunction grows, the argument of the exponential of equation (7) must be limited to keep the function from falling off. That is, without the limitation of the argument of the exponent the resulting curve will be bell-shaped instead of a desired "S-shape". The function reaches a peak when $Z_j=0$ and therefore $Z_j'$ should be held to 0 when $Z_j=0$. Accordingly, the value for B2 in FIG. 9 is generally chosen to be equal to 0 whereas A2 is a relatively large negative number relative to the range of $Z_j$.

The parameter $\rho_j$ in the argument of the exponential is a number between 1 and $-1/(n_j=1)$ depending upon to what degree the variables are related to the malfunction. In general the higher degree of correlation between the variables and the malfunction the higher will be the value of $\rho_j$ within its limits. If nothing is known of the degree of correlation then $\rho_j$ may be given the value of 0.

Equation (7) defines a function taking into account only the relevant variables with respect to a particular malfunction. To obtain the unnormalized conditional probability of occurrence of a malfunction given the entire set of variables, that is, $F_j(y)$, the expression in equation (7) must be multiplied by each of the functions of those variables not relevant to the considered malfunction. That is:

$$F_j(y) = \tilde{F}_j(y_{rj}) \times \pi_{q\epsilon s_j} f_q(y_q) \quad (10)$$

where $F_j(y_{rj})$ is that from equation (7) and $$\pi_{q\epsilon s_j} f_q(y_q)$$

represents the product of all $f_q(y_q)$ where q is in the set of $s_j$, $s_j$ connotating the nonrelevant variables.

Figure 10:
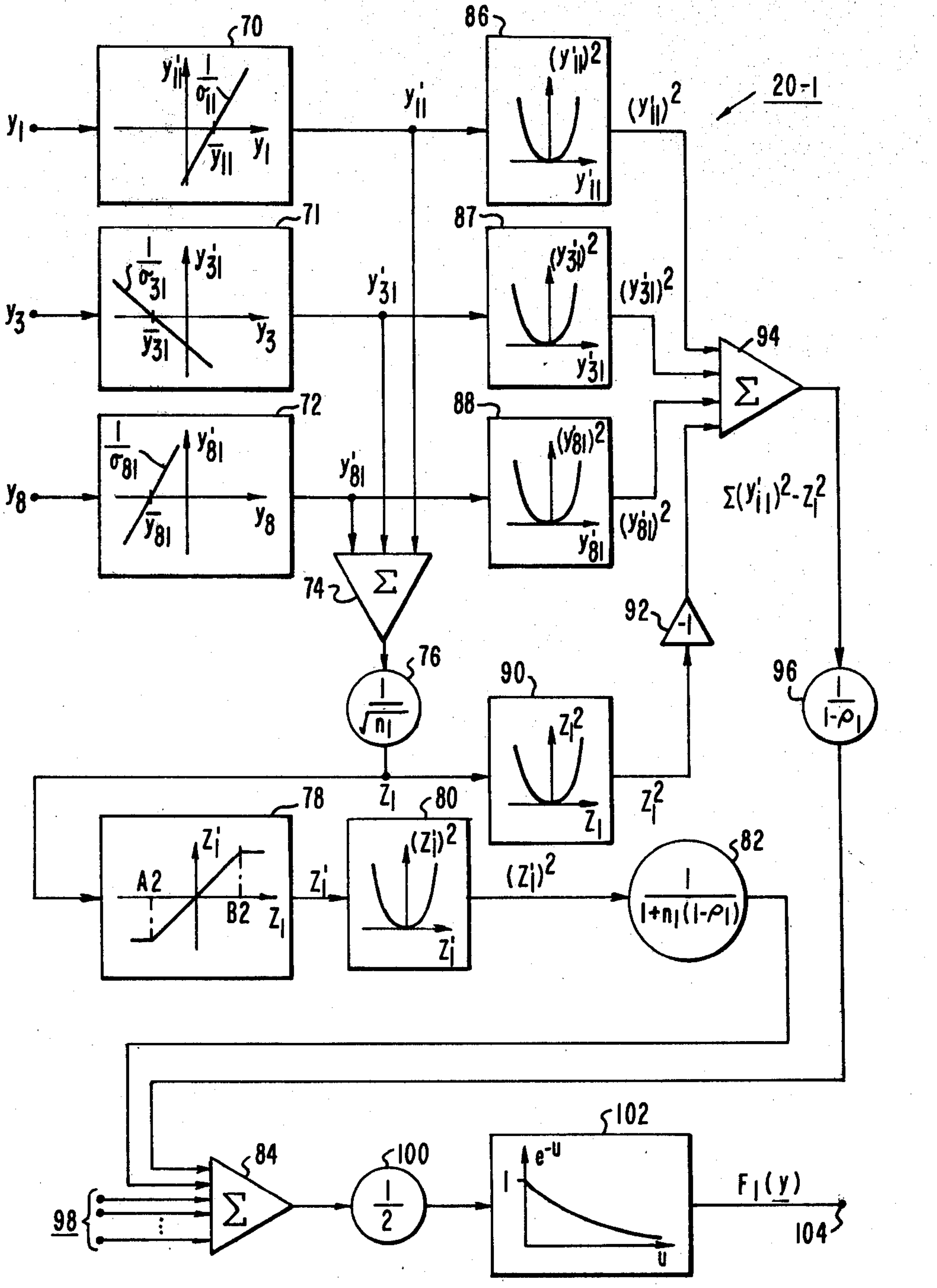
FIG. 10 is a block diagram further detailing another module of FIG. 2.

Each module 20-1 to 20-m of FIG. 2 functions to compute a respective value $F_j(y)$. By way of example FIG. 10 illustrates, in more detail, the module 20-1 operable to receive three variables $y_1$, $y_3$ and $y_8$ relevant to malfunction $M_1$ (i.e. $r_1=[1, 3, 8]$ and $j=1$) for deriving $F_1(y)$.

Circuits 70, 71 and 72 are respectively responsive to the input variables $y_1$, $y_3$ and $y_8$ to perform the shifting and scaling function of equation (8) so as to provide respective output signals $y'_{11}$, $y'_{31}$ and $y'_{81}$. The summation of these signals is performed by summing circuit 74 and the implementation of equation (9) to derive a value for $Z_1$ is obtained by multiplying or scaling the summed value by $1/\sqrt{n_1}$ by means of potentiometer 76. The first expression in the bracketed argument of equation (7) is obtained by transforming the $Z_1$ into a corresponding $Z'$ by means of circuit 78, squaring $Z_1'$ in squaring circuit 80, and then scaling by the factor $1/(1+n_1(1-\rho_1)$ by means of potentiometer 82. The resultant signal then forms one input to summing circuit 84.

The second term in the bracketed argument of equation (7) is obtained by squaring the transformed variables $y'_{11}$, $y'_{31}$ and $y'_{81}$ by respective squaring circuits 86, 87 and 88 and summing the results with $-Z_1^2$ obtained as the result of squaring the value $Z_1$ by squaring circuit 90 and obtaining the negative thereof by circuit 92. The output of summing circuit 94 is scaled by the factor $1/(1-\rho_1)$ by means of potentiometer 96, the output signal of which forms a second input to summing circuit 84.

Since the multiplication of exponentials is equivalent to adding their exponents, summing circuit 84 additionally receives, on lines 98, respective input signals $|x_i|^{k_i}$ from module 20-0 indicative of the exponents as in equation (5), of all the nonrelevant variables. In the present example of module 20-1 relative to malfunction 1, the relevant variables were given as r=[1,3,8] and the nonrelevant variables therefore would be s=[2,4,5,6,7,9,–,n]. The output of summing circuit 84 therefore represents the exponent of the bracketed term in equation (7) and all the nonrelevant $|x_i|^{k_i}$ of equation (5). These are multiplied by ½ by means of potentiometer 100, and by means of exponential circuit 102 an output signal $F_1(y)$ is derived on output line 104.

A similar procedure is carried out in the remaining modules 20-2 to 20-m to derive corresponding values $F_2(y)$ to $F_m(y)$. Thus having the values $F_0(y)$ and $F_j(y)$ for j=1 to m, the implementation of equation (1) may be conducted. This is accomplished with the provision of circuit 22 illustrated in more detail in FIG. 11. In order to derive the modifying factor relative to the probability that the measured system is not in a normal operating condition, that is $[1-F_0(y)]$, the value of $F_0(y)$ from module 20-0 is provided to summing circuit 110 after a sign inversion in circuit 112. The other input to summing circuit 110 is a signal of value 1. Summing circuit 114 receives the output signals from modules 20-1 to 20-m in addition to a signal indicative of PT to provide an output signal equivalent to the denominator of equation (1). Divider circuit 116 performs the division of output of summing circuits 100 by that of circuit 114 to provide an output signal which is multiplied by each of the $F_1(y)$ to $F_m(y)$ values in respective multiplier circuits 118-1 to 118-m, thus providing the implementation of equation (1) and a plurality of output signals on respective lines 120-1 to 120-m for recording and/or display. The output signal $P(M_u|y)$ is provided on output line 121 by multiplying the output of divider circuit 116 by the value PT and the output signal $P(M_0|y)$ on output line 123 is obtained directly from the input $F_0(y)$.

Figure 11:
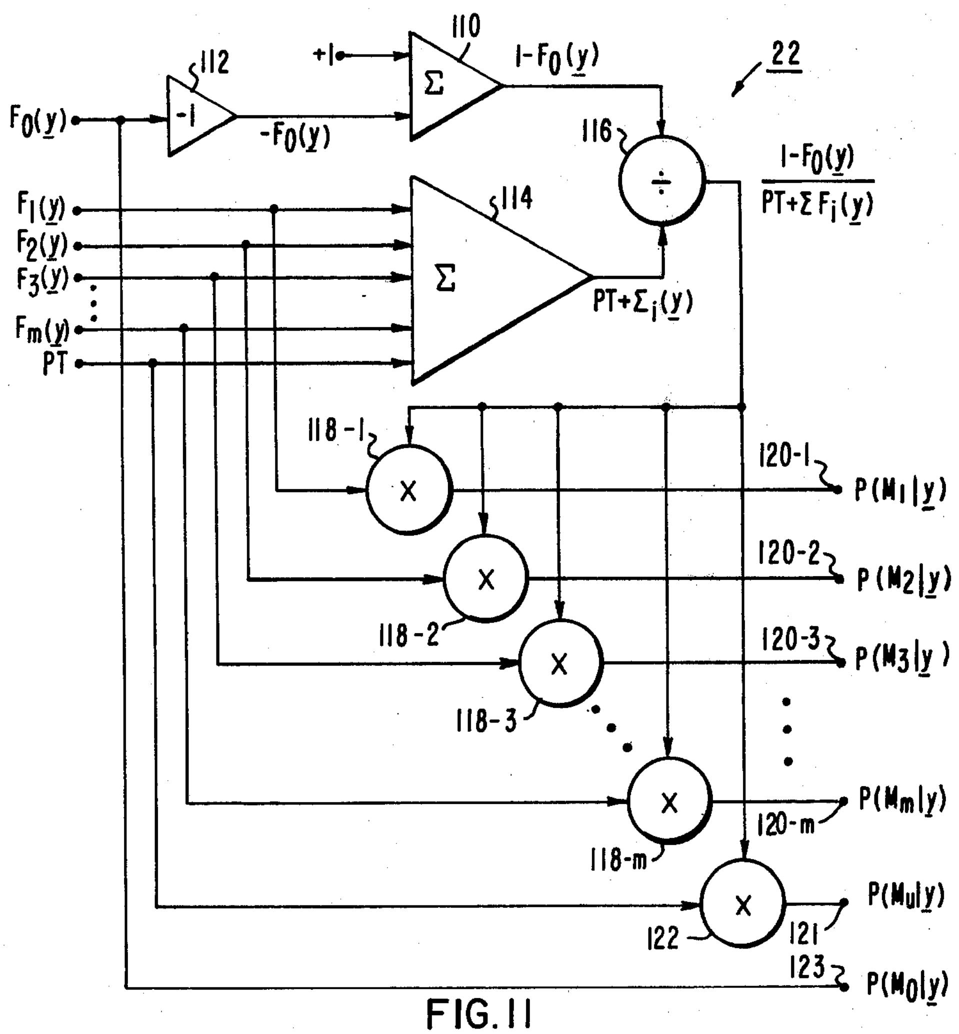
FIG. 11 is a block diagram further detailing a combining circuit of FIG. 2.

Although FIGS. 7, 10 and 11 illustrate standard well-known dedicated circuits, it is to be understood that the diagnostic function may with facility be performed by an analog computer or a programmed digital computer.

Figure 12:
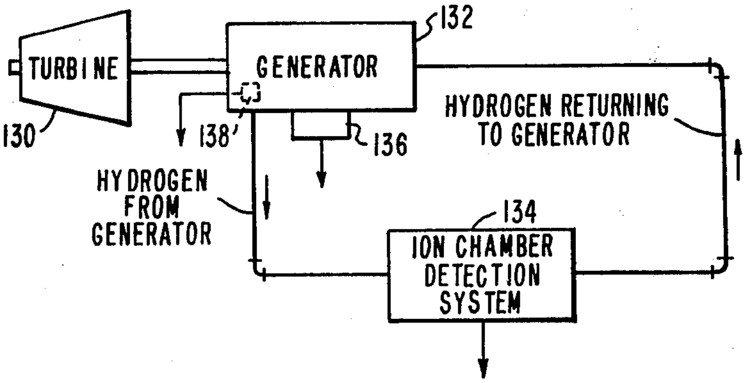
FIG. 12 is a block diagram of a turbine generator system illustrating coolant flow, and detection devices.

The diagnostic apparatus described herein is operable to provide malfunction probabilities for a wide variety of systems, one of which is illustrated by way of example in FIG. 12.

In one well-known power generating system, a steam turbine 130 drives a large generator 132, the condition of which is to be monitored. In such generators, electrical current is carried by conductors including hollow strands positioned in a laminated core and groups of conductors are connected together at phase leads. The generator is cooled by a circulating gas such as hydrogen which passes through the hollow strands and around the various parts of the generator. Vent tubes are provided between parts of the laminated core for conducting heat away from the core.

Various sensors may be provided for obtaining signals indicative of the operating condition of the generator and for purposes of illustration a diagnostic system will be described which is operable to provide an indication of a cracked coil strand, a cracked phase lead, or a blocked vent tube. A variety of sensor systems may be provided for detecting these malfunctions, and by way of example FIG. 12 includes three such sensor systems.

An ion chamber detection system 134 detects and measures thermally produced particulate matter in the circulating hydrogen gas and provides an output signal indicative thereof. Arcing is a symptom associated with stator insulation failure or conductor failure and measurement of the resultant radio frequency emission from the arc can be utilized to detect such arcing. Accordingly, an RF arc detector 136 is provided for generating an output signal indicative of internal arcing. A third measurement which may be utilized for detecting malfunctions is a temperature measurement, and accordingly a temperature sensor array 138 is provided and may be positioned at the hydrogen outlet. The signal conditioning circuit associated with the temperature measurement is operable to average the readings of all the temperature sensors of the array and compare each reading with the average. An output signal is then provided indicative of the high deviation from the average.

Figures 13, 13A:
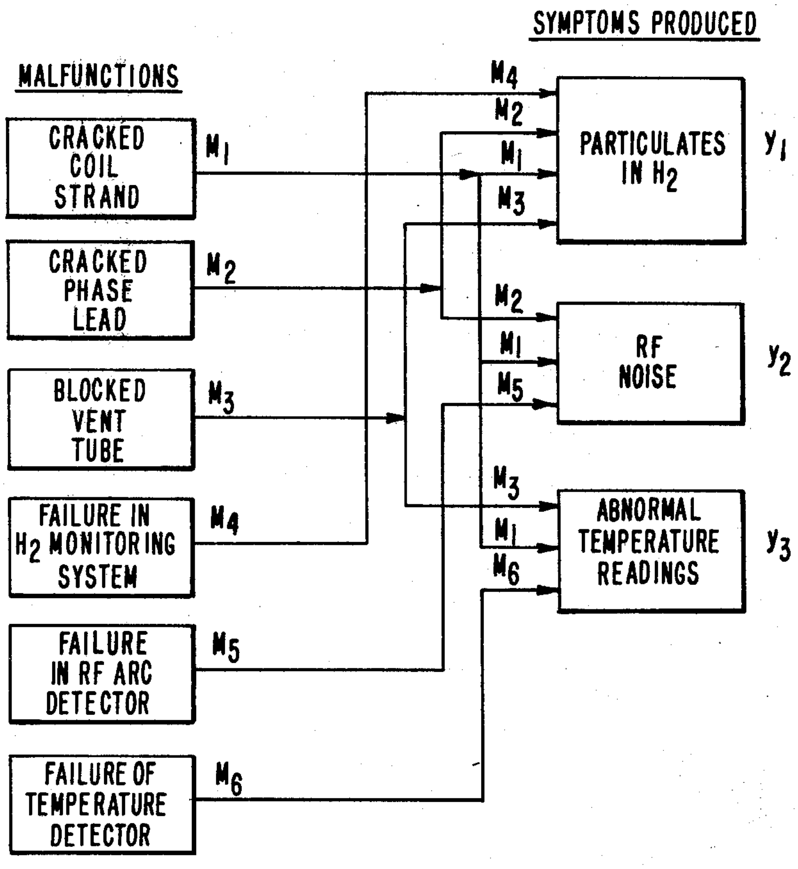
FIG. 13 is a block diagram correlating certain generator malfunctions with certain variables.
FIG. 13A is a chart summarizing this correlation.

FIG. 13 illustrates the relationship between the malfunctions and various symptoms produced by the malfunctions. The cracked coil strand is designated as malfunction $M_1$, the cracked phase lead as $M_2$ and the blocked vent tube as $M_3$. The diagnostic system of the present invention is also operable to monitor the sensors themselves and accordingly a failure in the hydrogen monitoring system is designated as malfunction $M_4$, a failure in the RF arc detector systems as $M_5$ and a failure of the temperature detector as $M_6$.

Any one of malfunctions $M_1$, $M_2$, $M_3$ or $M_4$ will manifest itself by an abnormal signal provided by the ion chamber detection system, the output signal of which after any necessary conditioning will be designated as variable $y_1$. Malfunctions $M_1$, $M_2$ and $M_5$ will produce RF noise or an incorrect output signal from the RF detector. The RF detector output signal, after any necessary conditioning, is designated as variable $y_2$. Malfunctions $M_1$, $M_3$ and $M_6$ will cause abnormal temperature readings, and the temperature sensor output signal after conditioning is herein designated as variable $y_3$.

The chart of FIG. 13A basically summarizes the relevant variables $y_i$ as they pertain to the various malfunctions $M_j$. The presence of an x indicates a strong correlation of a particular variable with a particular malfunction.

The first malfunction pertaining to a cracked coil strand is seen to be related to all three monitored variables. The second malfunction pertaining to a cracked phase lead is strongly related to the first two variables, while the third malfunction consisting of a blocked vent tube is seen to be strongly related to the first and third variables. Thus, each of these malfunctions are sufficiently different in their pattern of symptoms to be easily recognized.

Figure 14A:
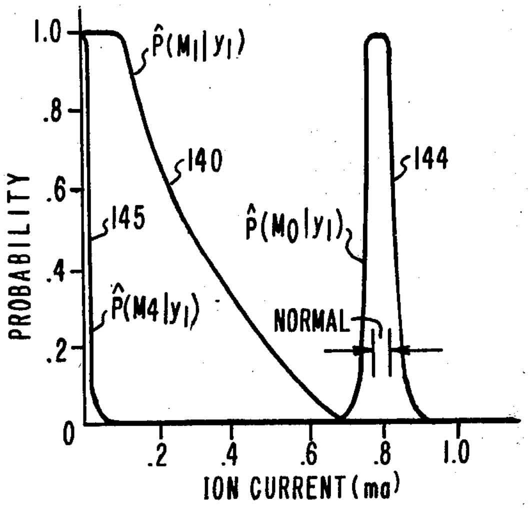
FIGS. 14A, B and C through 16A, B and C are probability curves with respect to certain variables to explain the diagnosis of the generator of FIG. 12.
Figure 14B:
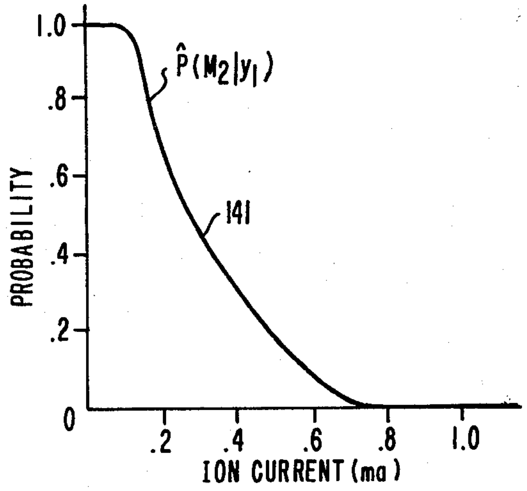
Figure 14C:
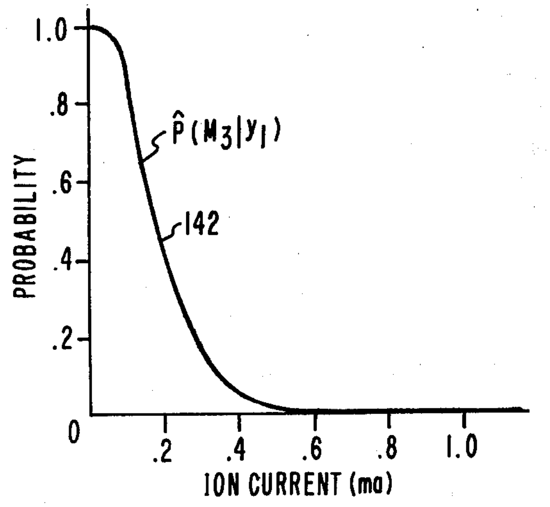

After a determination has been made as to which are the relevant variables for a particular malfunction, probability curves are generated which describe the probability of the occurrence of the malfunction with respect to each individual variable. Thus, in FIGS. 14A, 14B and 14C, curves 140, 141 and 142 respectively represent the probability of the occurrence of malfunctions $M_1$ (cracked coil strand), $M_2$ (cracked phase lead) and $M_3$ (blocked vent tube) as a function of variable $y_1$, ion current in milliamps, plotted on the horizontal axis. FIG. 14A additionally includes curves 144 and 145, curve 144 being indicative of the healthy or normal operating state of the generator and curve 145 describing the probability of the failure of the ion chamber detection system.

Since enough data has not been generated to predict with 100% accuracy the relationships illustrated, the curves have been generated by experienced people in the field to which this pertains. Accordingly, the character $\hat{P}$ indicates that the curves are best estimates.

Figure 15A:
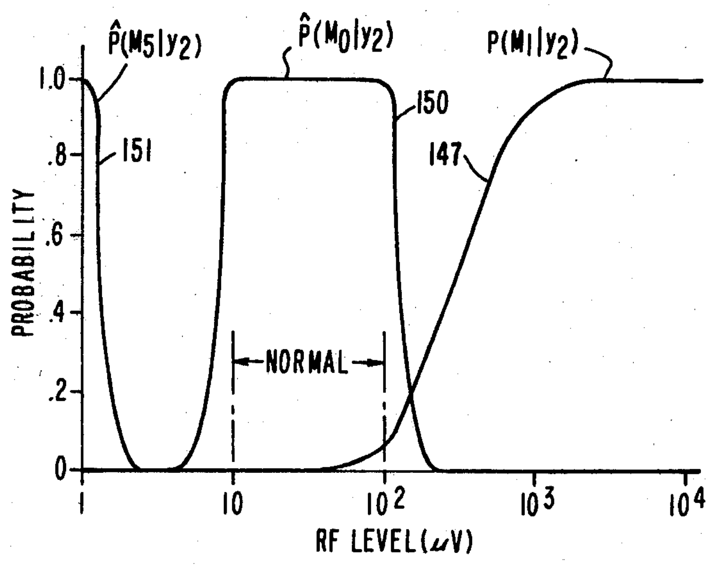
Figure 15B:
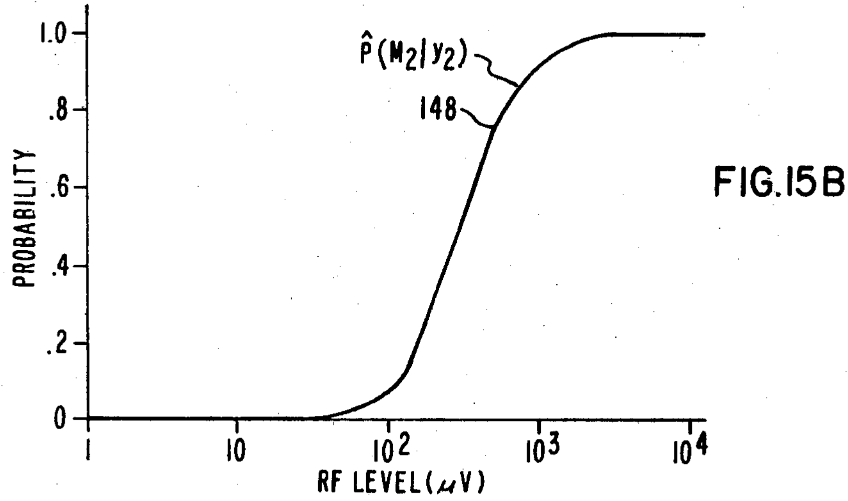
Figure 15C:
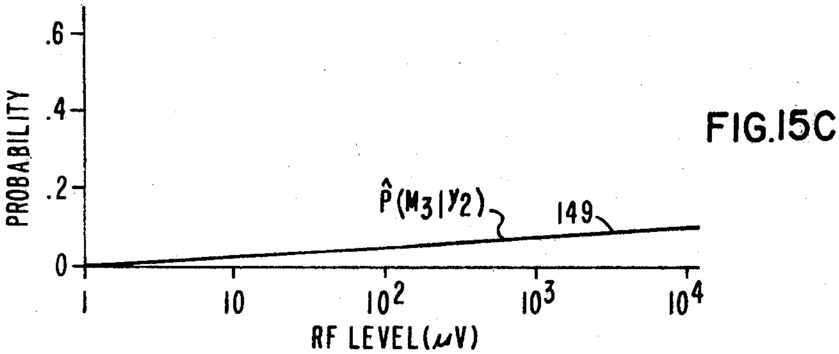

In a similar manner, curves 147, 148 and 149 of FIGS. 15A, 15B and 15C represent the respective probabilities of malfunctions $M_1$, $M_2$ and $M_3$ with respect to the second variable $y_2$. RF level in microvolts is plotted on the horizontal axis. Curves 150 and 151 in FIG. 15A characterize the normal behavior of the generator and the probability of malfuncton of the RF detection system, respectively.

Figure 16A:
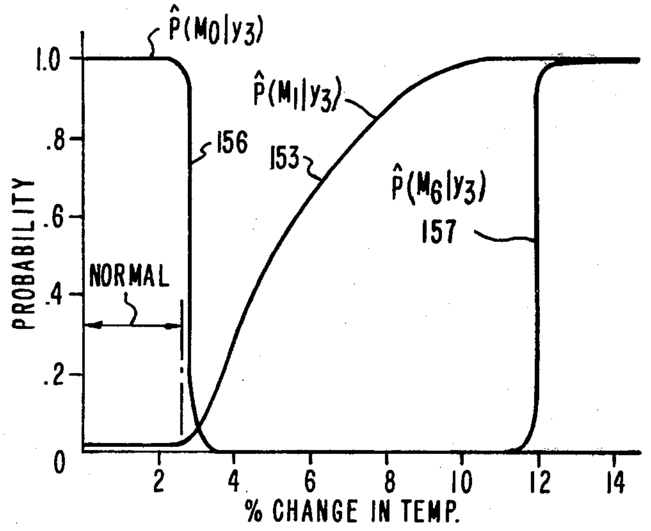
Figure 16B:
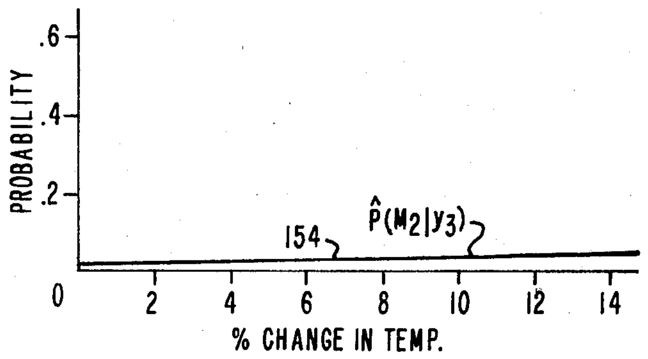
Figure 16C:
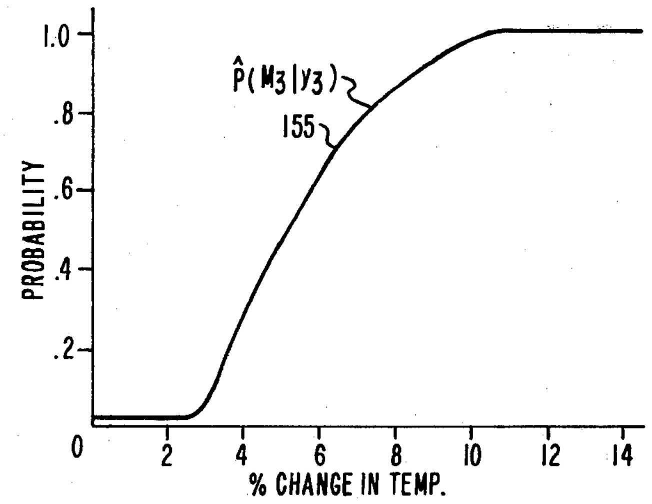

Curves 153, 154 and 155 of FIGS. 16A, 16B and 16C illustrate the respective malfunctions $M_1$, $M_2$ and $M_3$ with respect to the variable $y_3$. The percent change in temperature is plotted on the horizontal axis. The normal state of the machine is characterized by curve 156 in FIG. 16A and the probability of malfunction of the temperature sensor system is characterized by curve 157. It is to be noted that curves 149 and 154 of FIGS. 15C and 16B show very little correlation between the malfunction and the variable, and this shows up in the chart of FIG. 13A.

For each curve illustrated, the process described with respect to either FIG. 3 or FIG. 8 is carried out for determining the various terms utilized in the transformations so that the actual measured variables thereafter may be combined as previously described.

Figure 17:
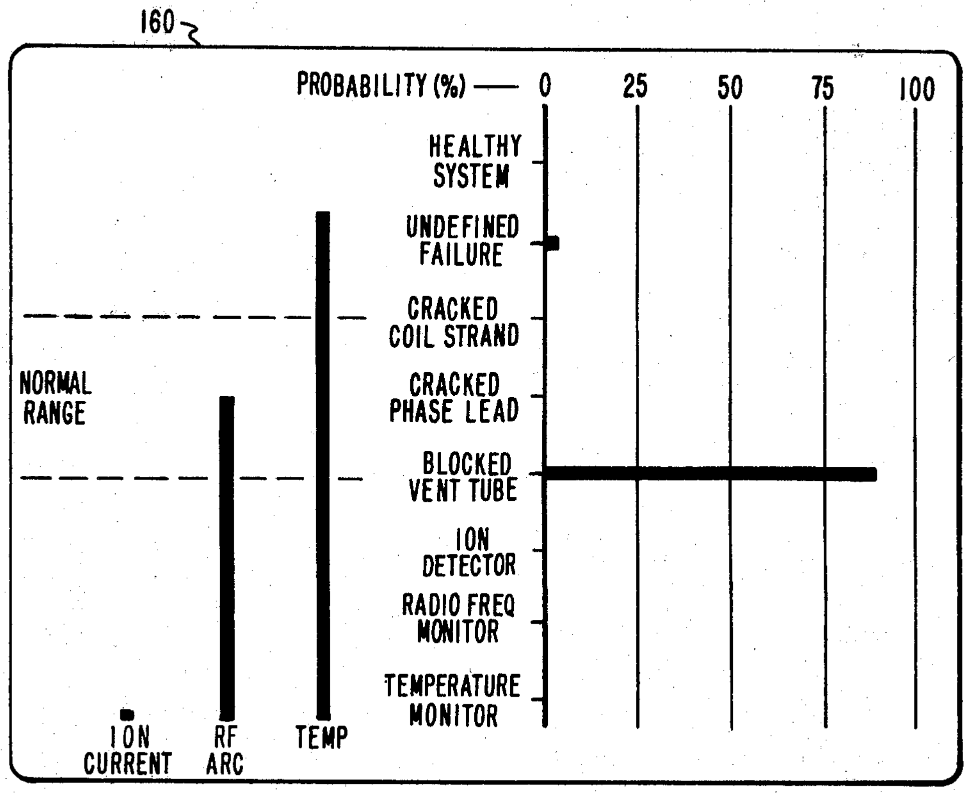
FIG. 17 illustrates a typical display for the monitoring system.
Figure 18:
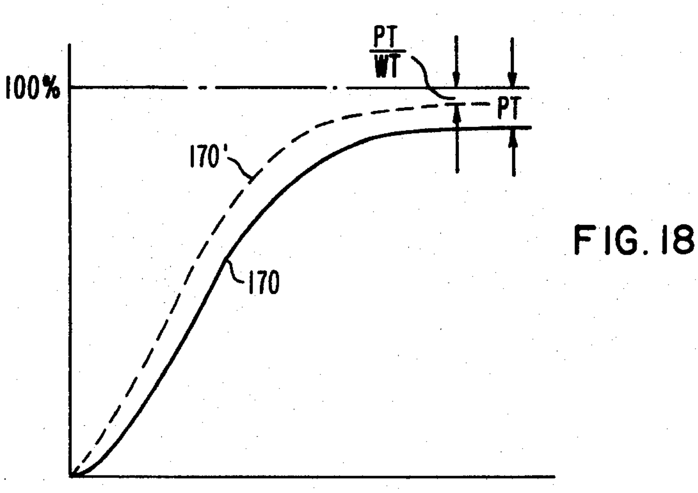
FIG. 18 shows curves illustrating the effect of the selection of certain valued weighting factors on the probability.

The system is operable to provide continuous output signals indicative of the probability of the listed malfunctions. By way of example, FIG. 17 illustrates a cathode ray tube 160 utilized to display in bar graph form, the probability of the occurrence of the listed malfunctions. With the value of PT in equation 1 being equal to 0.05, the magnitude of any one bar will not exceed a 95% probability. The display illustrates a situation resulting in a relatively high probability of a blocked vent tube, a small indication of an undefined failure, and of the three monitored variables, the ion current and temperature readings are out of the normal range while the radio frequency monitor variable (RF arc) is within the normal range.

FIG. 1 indicates that the variables from the signal conditioning circuits are also provided to the display 18. Accordingly, provision is made for displaying these variables, on the same cathode ray tube 160. If desired, the variables may be scaled for display so as to appear within a section designated as the normal range, when the symptoms of a malfunction are not prevalent.

An operator stationed at the display is therefore presented with a continuous picture of the present health of the generator system and can monitor any malfunction from an incipient condition to a point where corrective action should be undertaken. Although not illustrated, the display or other device may include provisions for alerting the operator as to what corrective action should be taken as the pattern of probabilities change.

With reference once again to FIG. 12, the specific case of the monitoring of generator 132 has been presented. As will be appreciated, the generator is part of an overall system which includes other equipment such as the turbine, boiler etc. In some systems there is no likelihood of measured variables in one piece of equipment being indicative of a malfunction in another piece of equipment. In such instances, it is preferred that the separate pieces of equipment be treated as individual systems for application of the present invention. In so doing, a much more accurate presentation of probability of malfunction occurrence for each individual system will be provided.

In the arrangement illustrated in FIG. 12, the diagnostic arrangement relative to the generator has been described. The turbine may also be considered as a system for which the diagnostic principles described herein are applicable. Equations (1) to (10) of the illustrated embodiment would apply to the steam turbine as well as they do to the generator. Figures similar to those of FIGS. 1 to 18 are applicable to the steam turbine embodiment. Malfunctions which may be continuously monitored include by way of example rotor imbalance, rotor bowing, loss of a blade or shroud, creep problems, rubs caused by cylinder distortion, impacts, steam whirl, friction whirl, oil whip, and rotor cracking. These malfunctions will cause abnormalities in measured variables which may include vibration variables with respect to frequency amplitude and phase, turbine speed, various temperatures located throughout the turbine system, turbine load, and various pressures, to name a few.

Some of the equations previously described may be further refined by modifying factors. For example, with respect to the function described by equation (7), the term in brackets may be raised to a predetermined power G such that $$\bar{f}_j(y_{rj}) = e^{-\frac{1}{2}DG} \tag{11}$$

where D is the bracketed term of equation (7).

The selection of modifier G may be made subjectively by holding all but one variable associated with equation (7) constant and in their normal range and then plotting the function to see how closely it matches the estimated probability curve plotted with respect to the one variable. Varying G will vary the shape of the function. If this is done for all variables an average G may be utilized.

Further, in some systems the presence of a particular variable which is not a relevant variable increases the a priori probability of a particular malfunction. For example, in the case of a steam generator a load change during certain operating conditions may increase the a priori probability of a thermal rotor bow. Under such circumstances, equation 1 may be modified by a certain weighting function $W_j(y)$ as indicated in equation 12.

$$P(M_j|y) = [1 - F_0(y)] \frac{F_j(y) W_j(y)}{PT + \sum_{j=1}^{m} F_j(y) W_j(y)} \tag{12}$$

In other words, a greater weight is given to a particular malfunction $M_j$ so that its probability of occurrence is essentially biased even before the relevant variables become abnormal. The weighting factor may have a value between 1 and some maximum WT.

The use of the weighting factor also increases the maximum probability of that particular malfunction. For example and with respect to FIG. 18, curve 170 illustrates a probability which approaches but never reaches the 100% level. The difference between the maximum probability as defined by curve 170 and the 100% level is the factor PT, chosen by way of example to be 0.05 such that the maximum probability will be 95%. With the inclusion of a weighting factor having the value WT, curve 170 is modified as indicated by curve 170' to approach within PT/WT of the maximum 100% probability.

Accordingly, a diagnostic system has been described in which variables associated with a monitored system are simultaneously combined in a real time situation to produce a single number or index as to the probability of a particular malfunction. In this manner an operator may be provided with better information on which to base operating decisions so as to prolong the life of the monitored system and reduce or eliminate the severity of any possible damage that may occur from a malfunction that is developing.

We claim:

1. Apparatus for identifying possible malfunctions in an operating system subject to m malfunctions, comprising:

(a) means including sensor means for obtaining indications of operating parameters of said system, some of said indications constituting variables relevant ($y_{rj}$) to a particular malfunction j while others constitute non-relevant variables ($y_{sj}$) with respect to that malfunction;

(b) means for modifying and combining said variables relevant to a particular malfunction in accordance with a predetermined function ($\tilde{F}j(y_{rj})$) and further modifying by a predetermined function $$\left(\prod_{q \in sj} fq(yq)\right)$$

of said non-relevant variables to obtain a malfunction indication (Fj(y));

(c) means for obtaining a normalized malfunction indication $$\left(\frac{Fj(y)}{\sum_{j=1}^{m} Fj(y)}\right)$$

(d) means for modifying said normalized malfunction indication by a factor related to the probability that said system is not in a normal operating condition (1−Fo(y))) to obtain the probability of the occurrence of a particular malfunction (P(Mj|y)).

2. Apparatus according to claim 1 which includes:

(a) means for limiting the probability of occurrence of a particular malfunction to a value less than 100%.

3. Apparatus according to claim 1 which includes:

(a) means for obtaining an indication of the probability of the existence of a normally operating system (P(Mo|y)) as a function of said variables.

4. Apparatus according to claim 3 which includes:

(a) means for obtaining an indication of the probability of the existence of an undefined malfunction (P(Mu|Y)).

5. Apparatus according to claim 1 which includes:

(a) means for displaying said malfunction probabilities (P(Mj|y)).

6. Apparatus according to claim 5 wherein:

(a) said display is in bar graph form.

7. Apparatus according to claim 1 which includes:

(a) means for displaying said indications of P(Mi|y), P(Mo|y), and P(Mu|y).

8. Apparatus according to claim 1 where:

(a) said sensors sare part of said operating system and indications of the probability of sensor malfunctions are obtained.

* * * * *